UNITED STATES PATENT OFFICE.

LUDWIG OTTO HELMERS, OF HAMBURG, GERMANY, ASSIGNOR TO ICHTHYOL GESELLSCHAFT, CORDES, HERMANNI & CO., OF SAME PLACE.

DEODORIZED COMPOUND OF MINERAL OILS AND PROCESS OF MAKING SAME.

SPECIFICATION forming part of Letters Patent No. 625,332, dated May 23, 1899.

Application filed April 23, 1898. Serial No. 678,633. (Specimens.)

*To all whom it may concern:*

Be it known that I, LUDWIG OTTO HELMERS, chemist, of 21 Bohnenstrasse, in the city of Hamburg, German Empire, have invented certain new and useful Improvements in and Relating to Sulfur Compounds of Mineral Oils and Similar Hydrocarbons, of which the following is a specification.

My invention relates to improvements in sulfonized carbon compounds obtained by the action of sulfuric acid or its substitutes on mineral oils or similar hydrocarbons; and the object of the same consists in rendering such substances odorless, or nearly so.

It is a well-known fact that the sulfonized carbon compound obtained from Seefeld mineral oil and known under the name of "ichthyol" possesses a very intense and peculiar smell, due to the presence of a volatile oil formed during the production of the said compound. This volatile oil may of course be removed by distillation with the aid of a current of steam. According to Fischer (*Real Encyclopädie der Gesammten Pharmacie*) this treatment, however, will cause a decomposition of the said compound itself.

By experiments made with the products of oxidation of the substances obtained by the action of sulfuric acid upon sulfureted mineral oils and similar hydrocarbons it has been observed that, for instance, the offensive smelling substances of the ichthyol are proportionately easiest oxidizable and transformed into nearly-odorless products by the absorption of oxygen. If the oxidation is increased, the remaining constituents of the ichthyol also undergo oxidation and a characteristically-smelling product is again obtained, which, however, is particularly distinguished from the ichthyol by its physical and chemical properties. If, therefore, a nearly-odorless preparation is to be obtained, care should be taken that an extremely small oxidizing action upon the product takes place. In consequence of this fact it has been stated, by attempts, that upon a hundred kilograms of ichthyol as brought into the market one-third kilogram of oxygen is sufficient to destroy the peculiar odor of the product. On oxidation of the ichthyol within this limit only the odorous substances are substantially oxidized, while all remaining constituents—viz., the sulfonic-acid salts, the sulfones, and sulfone-like bodies—are still unaltered. Consequently the preparation obtained still possesses strongly reducing properties.

I found that peroxid of hydrogen is the most suitable oxidizing agent, because the introduction into the sulfonized carbon compound of foreign substances or bodies difficult of removal is avoided. The peroxid of hydrogen hereby dissociates into water and oxygen and the latter unites with the smelling substances to form scentless bodies. The traces of aromatic smelling substances, which might be formed by an excess of the oxidizing agent, are volatilizable in aqueous vapors and may be removed, therefore, by employing a current of steam or by simply heating the preparation either *in vacuo* or under diminished or atmospheric pressure. The ichthyol sulfonic acid and other ichthyol salts, as well as all corresponding substances derived from sulfureted minerals oils and similar hydrocarbons combined with sulfuric acid, also behave like the ichthyol ammonium.

In order to make my invention more clearly understood, I will proceed to describe the same, by way of an example, as follows: Ten kilograms of ichthyol-ammonium are mixed with about 7.5 liters of water, and to this mixture is added a solution of peroxid of hydrogen as brought into the market, (containing about three per cent. of peroxid of hydrogen,) whereupon the whole is left at rest while kept cool. The characteristic odor of the ichthyol then disappears gradually, and instead of which a mild aromatic odor will be observed. After the lapse of twenty-four to forty-eight hours the mixture is decanted into a shallow vessel and then inspissated by heating. Together with the vaporizing water then also escape the minute quantities of the aromatic smelling substances. Finally the residue is again dissolved in water, neutralized by ammonia, and evaporated to the original weight—that is to say, ten kilograms.

Having fully described my invention, what I claim, and desire to secure by Letters Patent, is—

1. The process of rendering odorless, or nearly so, preparations from sulfonized compounds derived from sulfureted mineral oils by treatment with sulfuric acid, which consists in treating aqueous solutions of such substances, while kept cool, with an oxidizing agent and then concentrating the same by heating, substantially as set forth.

2. As a new product of manufacture, the herein-described preparations consisting of oxidized, sulfonized compounds derived from sulfureted mineral oils, which preparations are soluble in water and nearly free from odor.

LUDWIG OTTO HELMERS.

Witnesses:
ALEXANDER SPECHT,
E. H. N. MUMMENHOFF.